United States Patent Office 3,531,512
Patented Sept. 29, 1970

3,531,512
PROCESS OF PRODUCING URETHANES
William Baptist Hardy, Bound Brook, and Robert Putnam Bennett, Somerville, N.J., assignors to American Cyanamid Company, Stamford, Conn., a corporation of Maine
No Drawing. Continuation-in-part of application Ser. No. 496,687, Oct. 15, 1965, now Patent No. 3,467,694, Sept. 16, 1969. This application Apr. 18, 1967, Ser. No. 631,586
Int. Cl. C07c *101/44*
U.S. Cl. 260—471
8 Claims

ABSTRACT OF THE DISCLOSURE

A process of preparing a urethane which comprises reacting, in the presence of an effective amount of a catalyst consisting essentially of palladium and a Lewis acid, carbon monoxide, an hydroxyl-containing compound and an aromatic polynitro compound, said reaction being conducted under substantially anhydrous and hydrogen-free conditions under a pressure of at least 1,000 p.s.i., and at a temperature above about 140° C., but below that at which the starting materials and the product decompose.

---

This invention is a continuation-in-part of application Ser. No. 496,687, filed Oct. 15, 1965, now U.S. Pat 3,467,694 issued Sept. 16, 1969.

This invention relates to an improved method of preparing urethanes. More particularly, it relates to the preparation of urethanes by reacting an organic polynitro compound, an hydroxy compound and carbon monoxide under elevated temperature and pressure conditions in the presence of an effective amount of a catalyst comprising palladium and a Lewis acid.

Commercial needs for urethanes are partly satisfied by a process which comprises reacting an isocyanate with an hydroxyl compound, the reaction being conducted at elevated temperature. The isocyanate compound is relatively expensive, and operations are often complicated because of its toxicity. For these and other reasons, there is a definite need for a new method to serve as a commercial route to urethanes.

Recently, in British Pat. 993,704, published June 2, 1965, it was suggested that urethanes could be prepared without reliance upon isocyanate starting materials, by reacting a "nitrogenous" compound, an hydroxyl compound and carbon monoxide under elevated temperature and pressure conditions, in the presence of a "metal carbonyl" catalyst. The disclosure indicates the patentee's preference for carbonyls of rhodium. When specific embodiments of the British patent were meticulously followed in detail, starting with dinitrobenzene, bis-urethanes could not be recovered from, or even identified in, the reaction product.

More recently, Netherlands patent application No. 6,502,601, issued Nov. 25, 1965, proposed to improve the British process by use of a modified catalyst comprising the metal carbonyls of the British patent and a cocatalyst "which is by preference a metal or a salt of a metal that can exist in two or more valence states." A specific preference is stated for chlorides of iron or copper. When the British process is modified in accordance with the Netherlands teaching, the conversion of nitro starting materials to urethanes is much more successful. Mono-urethanes can be produced in high yields from mono-nitro compounds. Compounds with more than one urethane group can also be produced, but in much lower yields. In both cases, the urethane product is brownish in color, and in the case of bisurethanes, it is tarry as well. Though this process makes urethanes from low-cost nitro compounds, it is uneconomical from the standpoint of requiring a noble metal catalyst which is soluble in the product and thus difficult to separate for reuse. Catalyst loss would make the expense prohibitive and, unfortunately, also lead to a metal-contaminated product. Until the present invention, there was not a wholly satisfactory process for economically obtaining urethanes of high purity.

It is thus an object of this invention to provide a method by which urethanes can be prepared from low cost dinitro starting materials. Other objects will become apparent from the ensuing description of this invention.

In accordance with this invention, it has been discovered that urethanes can be obtained by a new high temperature-high pressure process which requires as its essential starting materials an aromatic polynitro compound, an hydroxyl compound, carbon monoxide and a catalyst comprising palladium and a Lewis acid.

The reaction between the polynitro compound, the hydroxyl-containing compound and carbon monoxide may be carried out in an autoclave or any other high pressure reactor. A simple procedure is to charge the polynitro compound, the hydroxyl compound and catalyst into the reaction vessel, introduce the proper amount of carbon monoxide, and then heat the mixture to obtain the desired reaction pressure. The reaction can be conducted as a continuous operation, or batchwise. Of course, the order of addition of the reactants may be varied to suit the particular apparatus which is employed. For example, the reactants may be introduced on a continuous basis into the heated reactor while, at the same time, the product is withdrawn. The reaction product is recovered and then treated by conventional procedures to effect separation of urethane from unreacted starting material, solvent, by-product, etc.

The present invention provides a generally applicable process for converting polynitro derivatives to the corresponding urethanes. Typical of the nitro compounds which can be converted to urethanes are carbocyclic aromatic derivatives such as m- and p-dinitrobenzene, dinitrotoluenes and isomeric mixtures thereof, 1,5-, 1,6- and 1,7-dinitronaphthalene, 2,2'-dinitrobiphenyl, and 4,4'-dinitrobiphenyl and 2,4,6-trinitrotoluene. Likewise, polynitro heterocyclic derivatives such as 3,5-dinitropyridine, 2,4- and 2,5-dinitrothiophene, 2,5-dinitrofuran and 3,6-dinitroquinoline may also be used.

The process of this invention is also applicable to nitro compounds with other substituents such as alkyl, haloalkyl, amino, alkenyl, alkoxy, halogen, acylamido, hydroxy, mercapto, carboxy, cyano, acyl, sulfo, sulfonyl, sulfamoyl, carbamoyl, phosphono, phosphino and silyl radicals. Among the substituted nitro compounds useful as starting materials herein, are 2,4-dinitrochlorobenzene, 3,5-dinitroanisole, dinitrodiphenylmethane, dinitroditolylmethane, trinitrodiphenylethane, tris(nitrophenyl)methane and tris(nitrotolyl)methane. Substituents do not, in general, interfere with the reaction of this invention. Certain substituents may themselves react with carbon monoxide or any other products resulting from the primary reaction, but the primary reaction, nevertheless, occurs. With this qualification, the process of this invention is applicable to any aromatic compound with a nitro group. Any hydroxyl-containing compound, or mixtures thereof, is contemplated for use herein, including mono- or poly- hydroxy, aromatic or aliphatic, substituted or unsubstituted compounds.

Aliphatic hydroxy compounds include alkane, cycloalkane, alkene, cycloalkene, alkyne, aralkane and aralkene derivatives in which the carbon chain may be interrupted with hetero linkages such as oxy, substituted imino or thio groups, and which may optionally have substituents such as halo, amido, alkoxy, tertiary amino, alkylthio, carboxy, cyano, aryloxy, aryl, sulfamoyl, carbamoyl, phosphono, etc., radicals. As examples of such compounds, there may be named methanol, ethanol, propanol, isopropanol, ethylene glycol, glycerol, mannitol, hydroxy-terminated polyesters, hydroxy-terminated polyethers, benzyl alcohol, pentaerythritol, cyclohexanol, beta-chloroethanol, 1,3-di-(N-beta-hydroxyethyl - 4 - piperidyl)propane, N,N-bis(beta-hydroxyethyl)acetamide, tris(beta-hydroxyethyl)amine, 3-hydroxyquinuclidine, tartaric acid, malic acid, beta-methylmercaptoethanol, 3 - hydroxypropionitrile, phenoxyethanol, isethionamide and 3-hydroxypropionamide.

Phenolic hydroxy compounds may be mono- or polynuclear and may have the same substituents as are optionally found on the aliphatic hydroxy compounds. Among the useful phenols are phenol, alpha- and beta-naphthol, resorcinol, cresol, xylenol, salicyclic acid, resorcyclic acid and chlorocresol.

Reaction conditions for optimum yields must be carefully controlled with respect to pressure and temperature. Pressures within the reactor must be in the range of about 1,000 p.s.i. to 100,000 p.s.i., or higher. Preferably, pressure should be above 2,000 p.s.i. The reaction will proceed at temperatures above about 140° C. and preferably between 150° C., and the temperature of decomposition of either starting material or product. The residence time will vary inversely with the temperature in the reactor. With more reactive starting materials, less stringent conditions may be employed. The particular conditions for a given reactant are easily determined in accordance with the foregoing principles.

It is desirable, but not necessary, that a solvent be employed, since many polynitro compounds are solids under reaction conditions. Suitable solvents are anhydrous liquids in which the nitro compound is soluble or dispersible, e.g., benzene, toluene, xylene, aliphatic halogenated hydrocarbons such as 1,1,2-trichloro-1,2,2-trifluoroethane, halogenated aromatic hydrocarbons such as monochlorobenzene, dichlorobenzene and trichlorobenzene. It is important that the solvent, as well as the other materials charged into the reactor, be essentially anhydrous, since in the presence of water the desired product is not obtained in a high yield. An excess of hydroxyl-containing compound may be used as the solvent, when it is a liquid under reaction conditions.

The amount of carbon monoxide pumped into the reactor should be sufficient to provide at least three moles of carbon monoxide per nitro group. Preferably, however, a large excess should be employed to give the super-atmospheric pressures required for preferred operation of the present invention.

The catalyst for the reaction of this invention comprises palladium and a Lewis acid as defined in the reference book by Jack Hine, "Physical Organic Chemistry," 1962, McGraw-Hill Book Co., New York. According to the reference, Bronsted acids are included by the term "Lewis acids." It is absolutely essential for this invention that a Lewis acid be initially present in the reaction mixture. The palladium may be used either in a metallic or a chemically combined state. It may be deployed either with or without a physical support. Among the compounds of palladium which can be used herein are oxides, sulfates, nitrates and halides.

The Lewis acid component of the catalyst can be a halide, acetate, sulfate or phosphate of a metal such as tin, titanium, gallium, iron, aluminum or copper.

As specific examples of Lewis acids one can name ferric chloride, ferrous chloride, stannic chloride, stannous chloride, aluminum chloride, titanium tetrachloride, aluminum bromide, gallium trichloride and cuprous chloride. Additional examples of the salt type of Lewis acids are listed in the reference book by George A. Olah, "Friedel-Crafts and Related Reactions," volume 1, 1963, Int. Publ., N.Y. Bronsted acids may be used providing they do not chemically convert the desired end product.

Within the group of useful Lewis acids, it is preferred to use strong Lewis acids having a halide anion. Chlorides of iron and aluminum are especially preferred.

The physical form of the catalyst can be varied to suit particular needs. The palladium can be self-supported or deposited upon a support which disperses it so as to increase active surface area. Such porous supports include alumina, silica, carbon, barium sulfate, calcium carbonate, asbestos, bentonite, diatomaceous earth, fuller's earth, and the like.

It is possible to deposit the palladium on a support and form the Lewis acid component in situ by conducting the reaction in a vessel which can supply a cation, when using a solvent medium which can supply an anion under reaction conditions. For example, if the walls of the reaction vessel contain iron and a halogen-containing solvent such as 1,1,2 - trichloro-1,2,2-trifluoroethane is used, under reaction conditions the corresponding iron halide will be formed. This fulfills the reaction requirement for a Lewis acid. Similarly, palladium and a base metal capable of forming a Lewis acid (e.g., a base metal such as iron or aluminum) may be deposited on a porous support. This base metal, in conjunction with a solvent medium comprising a halogenated solvent (e.g., 1,1,2-trichloro-1,2,2 - trifluoroethane or a similar halogenated aliphatic hydrocarbon), forms a Lewis acid under reaction conditions. Other means of forming the Lewis acid in situ will be apparent from these procedures.

A very useful catalytic system consists of ferric chloride and 5% palladium supported on alumina. The catalyst should be used in an effective amount. This amount will be determined by reaction pressure and temperature, purity of the polynitro starting material, etc. Once it is known that the desired reaction proceeds in the presence of a palladium-Lewis acid catalyst, it is within ordinary means to determine how much of each will be used. It has been found that a useful range is in the area of about $10^{-1}$ to $10^{-5}$ mole of palladium and $1 \times 10^{-1}$ to $1 \times 10^{-4}$ mole of Lewis acid per nitro group, and an equivalent of hydroxyl-containing compound for each equivalent of nitro compound, unless the hydroxyl-containing compound is the solvent, in which case an excess is present. As long as even trace amounts of the palladium are present, reaction will proceed. The upper limit of catalyst usage is governed primarily by cost considerations. A preferred catalyst system will have about 0.05–0.001 mole of Lewis acid and 0.05–0.0005 mole of palladium per nitro group. Within these areas, the centers of the respective ranges are especially preferred, but this preferred range depends greatly on the equipment and conditions used, i.e., the amount of agitation, concentrations, temperature, pressure, etc.

This invention is illustrated in the following examples, in which percentages are on a weight basis.

EXAMPLE 1

(A) A glass-lined autoclave is charged with 10.0 parts of m-dinitrobenzene, 80 parts of methanol, 1.5 parts of ferric chloride and 0.7 part of 5% palladium-on-alumina. The clave is pressurized with carbon monoxide to 5,400 p.s.i. It is then heated for one hour at 180–205° C. and 8,000 p.s.i., cooled and vented. The reaction mixture is filtered to remove the catalyst, and the filtrate is evaporated to dryness. The residue (13.0 parts) is triturated with dilute hydrochloric acid and recrystallized from chloroform. The product, dimethyl m-benzenedicarbamate, melts at 158–160° C.

(B) A similar reaction following the procedure of Example III of Netherlands Pat. 6,502,601 with use of rhodium carbonyl chloride was run for purposes of comparison.

An autoclave was charged with 10.0 parts of m-dinitrobenzene, 80 parts of methanol, 2.0 parts of ferric chloride and 0.3 part of rhodium carbonyl chloride. The clave was pressurized with carbon monoxide and was then heated for eight hours at 148–160° C. and about 2100 p.s.i. The reaction mixture was filtered but there was essentially no recovery of catalyst. Evaporation of the filtrate gave a tar (17.0 parts) from which no dimethyl m-benzenedicarbamate could be extracted with petroleum ether according to the procedure of the patent.

When the reaction was repeated and the tar was triturated with dilute hydrochloric acid and then extracted with chloroform, no dimethyl m-benzenedicarbamate was found. The same result was obtained when the procedure was repeated.

EXAMPLE 2

A tantalum-lined pressure vessel is charged with 9.1 parts 2,4-dinitrotoluene, 71 parts anhydrous ethanol, 5 parts 5% palladium-on-carbon and 0.5 part anhydrous ferric chloride. The clave is sealed, purged with nitrogen and pressurized with carbon monoxide to 2,700 p.s.i. It is then heated with rocking at 190° C. for two hours, cooled, vented and discharged. After removal of the catalyst by filtration, the filtrate is distilled to remove the solvent. The residue is diethyl toluene-2,4-dicarbamate.

EXAMPLE 3

The procedure of Example 2 is repeated usin 9.1 parts 2,6-dinitrotoluene. The product is diethyl toluene-2,6-dicarbamate.

EXAMPLE 4

The procedure of Example 2 is repeated with the autoclave heated at 150–160° C. for five hours. The product is a mixture of ethyl 2-methyl-5-nitrocarbanilate and ethyl 4-methyl-3-nitrocarbanilate. This example illustrates the importance of maintaining the temperature above about 160° C. so that a bisurethane can be produced in good yield from 2,4-dinitrotoluene.

EXAMPLE 5

The procedure of Example 2 is repeated using 8.4 parts m-dinitrobenzene, 79 parts anhydrous ethanol, 5 parts 5% palladium-on-carbon and 0.5 part anhydrous ferric chloride. After carbon monoxide is introduced to a pressure of 3,500 p.s.i., the autoclave is heated at 190° C. for three hours. The product is diethyl m-benzenedicarbamate.

EXAMPLE 6

The procedure of Example 2 is repeated using 10.13 parts 2,4-dinitrochlorobenzene, 79 parts anhydrous ethanol, 5 parts 5% palladium-on-carbon and 0.5 part ferric chloride. After carbon monoxide is introduced to a pressure of 4,150 p.s.i., the autoclave is heated at 190° C. for three hours. The product is diethyl 4-chloro-m-benzenedicarbamate.

EXAMPLE 7

The procedure of Example 2 is repeated substituting an equivalent amount of 1,5-dinitronaphthalene for the 2,4-dinitrotoluene. The product is diethyl 1,5-naphthalenedicarbamate.

EXAMPLE 8

The procedure of Example 2 is repeated substituting an equivalent amount of 4,4′-dinitrodiphenylmethane for the 2,4-dinitrotoluene. The product is diethyl 4,4′-methylenedicarbanilate.

EXAMPLE 9

The procedure of Example 2 is repeated using 18.2 parts 2,4-dinitrotoluene, 0.5 part 5% palladium-on-carbon, 8 parts ethanol and .2 part aluminum chloride. The autoclave is sealed, purged with nitrogen and pressurized with carbon monoxide to 5,000 p.s.i. It is then heated with rocking at 200° C. for three hours. The product is diethyl toluene-2,4-dicarbamate.

EXAMPLE 10

The procedure of Example 2 is followed substituting 0.6 part cupric chloride for the ferric chloride. The product is diethyl toluene-2,4-dicarbamate.

EXAMPLE 11

The procedure of Example 2 is followed substituting 0.5 part lithium chloride for the ferric chloride. The product is diethyl toluene-2,4-dicarbamate.

EXAMPLE 12

The procedure of Example 2 is followed substituting 0.39 part ferrous chloride for the ferric chloride. The product is diethyl toluene-2,4-dicarbamate.

EXAMPLE 13

The general procedure of Example 2 is followed using 18.2 parts 2,4-dinitrotoluene, 2.0 parts ferric chloride, 2.5 parts 2% palladium-on-activated clay, and 80 parts ethanol. The clave is pressurized with carbon monoxide to 5,400 p.s.i. and then heated at 190° for one hour. The product is diethyl toluene-2,4-dicarbamate.

EXAMPLE 14

The procedure of Example 13 is followed substituting 5.0 parts 1% palladium-on-silica-alumina for the palladium-on-activated clay and 1.5 parts ferric chloride for the 2.0 parts ferric chloride. The product is diethyl toluene-2,4-dicarbamate.

EXAMPLE 15

The procedure of Example 13 is followed substituting 5 parts 2% palladium-on-silica gel for the palladium-on-activated clay. The product is diethyl toluene-2,4-dicarbamate.

EXAMPLE 16

The procedure of Example 13 is followed substituting 0.265 part 1% palladium-on-activated alumina. The product is diethyl toluene-2,4-dicarbamate.

EXAMPLE 17

The procedure of Example 13 is followed substituting 2.5 parts 5% palladium-on-barium sulfate for the 2% palladium - on - activated clay. The product is diethyl toluene-2,4-dicarbamate.

EXAMPLE 18

The general procedure of Example 2 is followed using 18.2 parts 2,4-dinitrotoluene, 0.5 part ferric chloride, 0.3 part palladium black (no support) and 80 parts ethyl alcohol. The clave is pressurized with carbon monoxide to 3,000 p.s.i. and then heated at 190° C. for three hours. The product is diethyl toluene-2,4-dicarbamate.

EXAMPLE 19

The procedure of Example 13 is followed omitting the palladium-on-activated clay and using a tantalum autoclave having a thin film of palladium plated on the walls of the clave. The product is diethyl toluene-2,4-dicarbamate.

EXAMPLE 20

The procedure of Example 2 is followed substituting 78 parts isopropyl alcohol for the ethanol. The product is diisopropyl toluene-2,4-dicarbamate.

EXAMPLE 21

The general procedure of Example 2 is repeated substituting an equivalent amount of allyl alcohol for the ethanol. The product is diallyl toluene-2,4-dicarbamate.

EXAMPLE 22

The procedure of Example 2 is repeated substituting an equivalent amount 2,4-dinitrochlorobenzene for the 2,4-dinitrotoluene and an equivalent amount of ethylene glycol for the ethanol. The product is a chlorinated polymeric urethane.

EXAMPLE 23

The general procedure of Example 2 is repeated substituting equivalent amounts of 3,5-dinitrobenzotrifluoride and methanol for the reactants used therein. The product is dimethyl trifluoromethylbenzene-3,5-dicarbamate.

EXAMPLE 24

The general procedure of Example 2 is repeated substituting an equivalent amount of 3,5-dinitropyridine for the nitro compound used therein and an equivalent amount of n-hexanol for the ethanol. The product is dihexyl pyridine-3,5-dicarbamate.

EXAMPLE 25

The procedure of Example 2 is repeated substituting 18.8 parts of phenol and 70 parts of benzene for the ethanol. After carbon monoxide is introduced to a pressure of 4,000 p.s.i., the clave is heated at 190° C. for five hours. The product is diphenyl toluene-2,4-dicarbamate.

EXAMPLE 26

The procedure of Example 25 is repeated substituting an equivalent amount of N,N-diethylglycolamide for the phenol. The product is bis(N,N-diethylcarbamylmethyl) toluene-2,4-dicarbamate.

EXAMPLE 27

The procedure of Example 25 is repeated substituting an equivalent amount of 2-(methylthio)ethanol for the phenol. The product is bis[2-methylthio)ethyl]toluene-2,4-dicarbamate.

EXAMPLE 28

The procedure of example 25 is repeated substituting an equivalent amount of isothionamide for the phenol. The product is bis(2-sulfamylethyl)toluene-2,4-dicarbamate.

EXAMPLE 29

The procedure of Example 25 is repeated substituting an equivalent amount of diethyl 3-hydroxypropylphosphonate for the phenol. The product is the toluene-2,4-dicarbamate of diethyl 3-hydroxypropylphosphonate.

EXAMPLE 30

The procedure of Example 25 is repeated substituting for the phenol an equivalent amount of a polyester glycol prepared from ethylene glycol and adipic acid and having a molecular weight of 1,000. The product is a polymeric polyester urethane.

EXAMPLE 31

The procedure of Example 25 is repeated substituting for the phenol an equivalent amount of poly(propylene ether glycol). The product is a polymeric polyether urethane.

EXAMPLE 32

(A) A glass-lined autoclave is charged with 10.0 parts of m-dinitrobenzene, 80 parts of methanol, 1.5 parts of ferric chloride and 0.7 part of 5% palladium-on-alumina. The clave is pressurized with carbon monoxide and heated for 1 hour at 190° C. and 9,000 p.s.i., cooled and vented. The reaction mixture is filtered to remove the catalyst, and the filtrate is evaporated. The residue is washed with dilute hydrochloric acid (about 2% HCl). The mixture is filtered and the filter cake is washed with water and dried. The petroleum ether insoluble, nearly colorless product, dimethyl m-benzenedicarbamate, melts at 158–160° C. and amounts to about 9.56 parts (71% of theory based on the m-dinitrobenzene).

(B) A similar reaction using the reactants of Netherlands Pat. 6,502,601 (Example III) and the above reaction conditions was run for comparison. The autoclave was charged with 10.0 g. of m-dinitrobenzene, 80 g. of methanol, 2.0 g. of ferric chloride and 0.3 g. of rhodium carbonyl chloride. The brown product, impure dimethyl m-benzenedicarbamate containing a rhodium carbonyl, melted at 148–151° C. and amounted to 3.33 g. (25% of theory based on the m-dinitrobenzene). When this reaction was twice repeated, only tar was obtained in one instance, and a 19% yield of impure product in the other.

EXAMPLE 33

(A) A glass-lined autoclave is charged with 10.0 parts of m-dinitrobenzene, 80 parts of methanol, 2.0 parts of ferric chloride and 2.5 parts of 5% palladium-on-alumina. The clave is pressurized with carbon monoxide, heated for 8 hours at 150° C. and 2200 p.s.i., cooled and vented. The reaction mixture is filtered to remove the catalyst, and the filtrate is evaporated. The residue is washed with dilute hydrochloric acid (about 2% HCl), washed with water and dried. The product, containing more than 90% of real dimethyl m-benzenedicarbamate, amounts to about 9.84 parts.

(B) A similar reaction, using the reactants of Netherlands Pat. 6,502,601 (Example III) and the above reaction conditions, was run for comparison. The autoclave was charged with 10.0 g. of m-dinitrobenzene, 80 g. of methanol, 2.0 g. of ferric chloride and 0.3 g. of rhodium carbonyl chloride. The product was a tar (17.0 g.) in which no dimethyl m-benzenedicarbamate could be isolated.

EXAMPLE 34

(A) A glass-lined autoclave is charged with 10.9 parts of 2,4-dinitrotoluene, 80 parts of ethanol, 2.0 parts of ferric chloride and 2.5 parts of 5% palladium-on-alumina. The clave is pressurized with carbon monoxide and heated for one hour at 190° C. and 9,000 p.s.i. After cooling and venting the autoclave, the reaction mixture is filtered to remove the catalyst, and the filtrate is evaporated. The residue is washed with dilute hydrochloric acid (about 2% HCl), washed with water and dried. The product, diethyl toluene-2,4-dicarbamate, amounts to more than 80% of theory based on the 2,4-dinitrotoluene.

(B) A similar reaction using the catalyst system of Netherlands Pat. 6,502,601 and the above reaction conditions was run for comparison. The autoclave was charged with 10.9 g. of 2,4-dinitrotoluene, 80 parts of ethanol, 2.0 parts of ferric chloride and 0.3 part of rhodium carbonyl chloride. The yield of diethyl toluene-2,4-dicarbamate was 49% of theory based on the 2,4-dinitrotoluene.

EXAMPLE 35

(A) A glass-lined autoclave is charged with 7.7 parts of bis(p-nitrophenyl)methane, 80 parts of ethanol, 1.0 part of ferric chloride and 1.25 parts of 5% palladium-on-alumina. The autoclave is pressurized with carbon monoxide, heated for one hour at 190° C. and 9,300 p.s.i., cooled and vented. The reaction mixture is filtered to remove the catalyst, and the filtrate is evaporated. The residue is washed with dilute hydrochloric acid (about 2% HCl), washed with water and dried. The product, diethyl 4,4'-methylenedicarbanilate, amounts to 90% theory based on the bis(p-nitrophenyl)methane.

(B) A similar reaction using 0.15 part of rhodium carbonyl chloride in place of the palladium-on-alumina gave a tarry product from which no urethane could be isolated.

The difference between the two catalyst systems of Examples 32, 33, 34 and 35 is striking. In every case where a solid product is obtained with the rhodium catalyst, it is still brown and contains metal carbonyl. At the same point, the product from the palladium system is usually off-white and reasonably pure. The palladium catalyst gives not only higher yields, but also is readily recovered in a form in which it is immediately reusable.

EXAMPLE 36

Two experiments are carried out, each using 18.2 parts of 2,4-dinitrotoluene, 80 parts of ethanol, 2.5 parts of ferric chloride and the amount of noble metal shown below.

(A) 2.0 parts of 5% platinum-on-carbon, one hour at 190–210° C. and 9,000 p.s.i. Much carbon is formed. IR analysis shows the presence of nitro and amine groups in the product.

(B) 5.0 parts of 5% platinum-on-carbon, one hour at 188–200° C. and 8,700–9,200 p.s.i. Much carbon is formed. Some amine and possibly carbonyl groups are present in the product, but there is no evidence of a bisurethane.

EXAMPLE 37

A glass-lined autoclave is charged with 6.81 parts of 2,4,6-trinitrotoluene, 80 parts of ethanol, 7.5 parts of 5% palladium-on-alumina and 2.5 parts of ferric chloride. The clave is pressurized with carbon monoxide to 5,000 p.s.i., heated for 2 hours at 170° C., cooled and vented. The reaction mixture is filtered and the filtrate is evaporated. The residue is triturated with dilute hydrochloric acid (about 2% HCl), washed with water and dried. The product, triethyl toluene-2,4,6-tricarbamate, amounts to about 7.16 parts (68% of theory based on the trinitrotoluene) and melts at 191–193° C.

We claim:
1. A process of preparing a urethane which comprises reacting, in the presence of an effective amount of a catalyst consisting essentially of palladium and a Lewis acid, carbon monoxide, an aromatic or aliphatic hydroxy compound and a carbocyclic aromatic or heterocyclic aromatic polynitro compound, said reaction being conducted under substantially anhydrous and hydrogen-free conditions under a pressure of at least 1,000 p.s.i., and at a temperature above about 140° C., but below that at which the starting materials and the products decompose.

2. The process of claim 1 wherein the Lewis acid is a halide of iron or aluminum.

3. A process of preparing a bisurethane according to claim 1 wherein an organic dinitro compound is used and the reaction temperature is at least about 150° C.

4. The process according to claim 1 wherein the reaction pressure is above about 2,000 p.s.i.

5. The process of claim 4 wherein the dinitro compound is a dinitrotoluene.

6. The process of claim 4 wherein the palladium is dispersed on a porous support and the Lewis acid is a halide of iron or aluminum.

7. The process of claim 2 wherein the Lewis acid is an iron chloride.

8. The process of claim 6 wherein the Lewis acid is an iron chloride.

References Cited

UNITED STATES PATENTS 3,448,140    6/1969    Gamlen et al. _____ 260—471

LORRAINE A. WEINBERGER, Primary Examiner

L. A. THAXTON, Assistant Examiner

U.S. Cl. X.R.

260—295.5, 470, 858, 938